A. J. Sessions,

Traveling-Bag Fastener,

No. 2,345. Reissued Aug. 28, 1866

Witnesses;
E. W. Bligh
Jenny W. Bligh

Inventor;
Albert J. Sessions

N. PETERS, PHOTO-LITHOGRAPHER, WASHINGTON, D. C.

UNITED STATES PATENT OFFICE.

ALBERT J. SESSIONS, OF BRISTOL, CONNECTICUT.

IMPROVEMENT IN BAG-FRAMES.

Specification forming part of Letters Patent No. 55,543, dated June 12, 1866; Reissue No. 2,345, dated August 28, 1866.

*To all whom it may concern:*

Be it known that I, ALBERT J. SESSIONS, of Bristol, county of Hartford, and State of Connecticut, have invented a certain new and useful Improvement in Bag-Frames; and I do hereby declare that the same is described and represented so as to enable a person skilled in the art to make and use the same therefrom, reference being had to the drawings, and letters of reference marked thereon, which indicate like parts in each of the figures.

The nature of this improvement will be understood from the specification and drawings.

The object desired to be attained thereby is to produce the rim and side out of one piece of metal; or, in other words, it consists in forming the side and edge or rim of the corners of the frame in one piece of metal, whether the frame be made in one or more pieces of metal.

To be more particular, it consists in making or forming the angles or corners of a bag-frame (consisting of two parts hinged together,) with side and rim edge, from one piece of metal, whether one-half of the frame be made in one or more pieces.

It further consists in cutting a piece or strip of metal the proper width and length, so that when bent into shape it will form the corners with side and rim, or it may form not only the corners, but the entire half of a bag-frame. Thus in slitting or forming proper openings (more or less) at suitable intervals lengthwise of said strip or strips, and in doing so to so cut the metal near where the corners are formed that when one half of said strips are bent (which forms the rim) into about a right angle with the other half, (which forms the side,) and then bent so as to form the corners or jaws of the frame, the cut edges of the sides will just lap sufficiently to rivet and form a true (or nearly so) round corner outside and a square corner inside. Thus each half of this frame may be made of two or more pieces of metal, and riveted together at points indicated by red lines, or at other convenient points, thus producing a bag-frame each half having its corners made from one or in one piece of metal, and yet be made in two or more pieces of metal. I therefore do not wish to confine myself to making one half or each half of a bag-frame in one piece of metal, while I still believe it to be the best way to make each half of the frame in one piece of metal, thereby greatly facilitating and cheapening the manufacture of said frames.

The making of the joints and securing the lock to the frame is performed much in the usual way.

Figure 3:
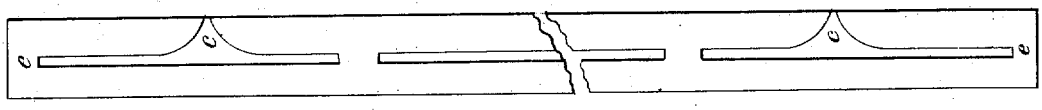
Figure 2:
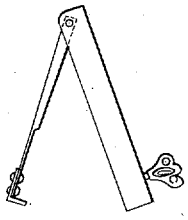
Figure 1:
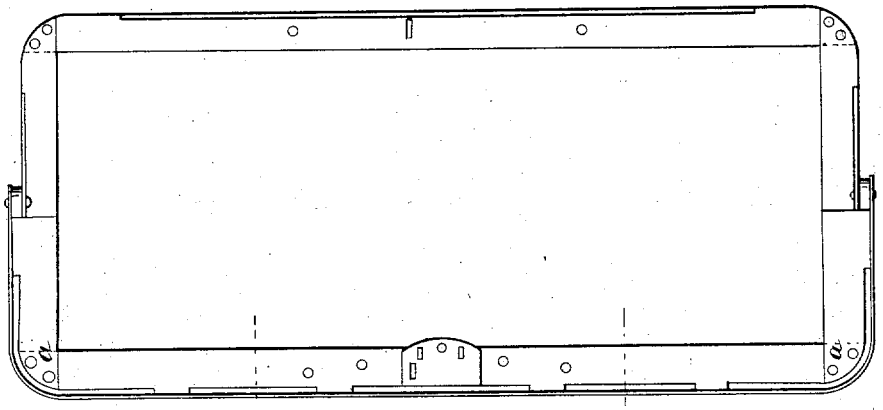

In the accompanying drawings, Figure 1 shows an open bag-frame. Fig. 2 is an edge view, showing how the side pieces lap and are secured together. Fig. 3 shows how or in what shape the strips are cut or punched to form the corners of the frame, as shown at *a*.

*c* are the slits or openings (more or less in number) formed near the center, either round or square, and lengthwise thereof, one part of which forms the side, and the other the rim, of the frame.

*e* shows the shape the sides are cut to form the joint, so as to form a true round corner (or nearly so) outside and a square corner on the inside of the jaws of the frame.

Thus each half of a bag-frame may be made in two or more parts, as shown in Fig. 3, having its corners made or formed in one piece of metal, and the two or more parts fastened together at any convenient points, when desirable.

Thus I am enabled to produce a better and cheaper frame, and the more desirable for the reason that its inside angles or corners are square and its outside corners are round.

I believe I have thus shown the nature, construction, and advantage of this improvement, so as to enable others skilled to make and use the same therefrom.

What I claim, therefore, and desire to secure by Letters Patent, is—

1. Slitting or punching the strip, substantially as described, so as to form the side and rim of the corner or corners of a frame in one piece of metal.

2. Forming the inside corners square at *a*, substantially as described.

3. Forming the inside corners of a bag-frame square, while the outside corners are flattened, curved, or rounded, by means substantially as described.

ALBERT J. SESSIONS. [L. S.]

Witnesses:

E. W. BLISS,

JEREMY W. BLISS.